United States Patent
Wahlquist

(12) United States Patent (10) Patent No.: US 7,463,711 B1
Wahlquist (45) Date of Patent: Dec. 9, 2008

(54) FUEL CHANNEL FASTENER

(75) Inventor: Kendall J. Wahlquist, Benton City, WA (US)

(73) Assignee: AREVA NP Inc., Lynchburg, VA (US)

( * ) Notice: Subject to any disclaimer, the term of this patent is extended or adjusted under 35 U.S.C. 154(b) by 292 days.

(21) Appl. No.: 10/853,794

(22) Filed: May 25, 2004

(51) Int. Cl.
*G21C 3/00* (2006.01)

(52) U.S. Cl. .................. 376/409; 376/438; 376/453

(58) Field of Classification Search .......... 376/409, 376/438, 453, 403
See application file for complete search history.

(56) References Cited

U.S. PATENT DOCUMENTS

| | | | | |
|---|---|---|---|---|
| 3,338,791 A | * | 8/1967 | Lass et al. | 376/448 |
| 4,764,340 A | * | 8/1988 | Lui et al. | 376/434 |
| 4,830,531 A | * | 5/1989 | Condit et al. | 403/348 |
| 4,861,545 A | * | 8/1989 | Lippert | 376/448 |
| 5,519,746 A | | 5/1996 | Dalke et al. | |
| 6,516,043 B1 | | 2/2003 | Chaki et al. | |
| 6,643,350 B2 | | 11/2003 | Masumi | |
| D494,887 S | | 8/2004 | Walraven | |

FOREIGN PATENT DOCUMENTS

| | | | |
|---|---|---|---|
| JP | 60230088 | * | 11/1985 |
| JP | 62066194 | * | 3/1987 |
| JP | 08054485 | * | 2/1996 |
| JP | 11-231084 | * | 8/1999 |
| JP | 11231084 | * | 8/1999 |

* cited by examiner

*Primary Examiner*—Rick Palabrica
(74) *Attorney, Agent, or Firm*—Kenyon & Kenyon LLP

(57) ABSTRACT

A fuel channel fastener having a body with a hole, a bolt inserted into the hole, at least two anti-rotation supports attached to the body, a spring configured to attach to the body and to extend away from the body down the sides of a fuel assembly fuel channel, and at least two spring anti-rotation pads connected to the body.

12 Claims, 5 Drawing Sheets

FUEL CHANNEL FASTENER

FIELD OF THE INVENTION

The invention is related to nuclear fuel assembly channel fasteners. More specifically, the invention relates to a boiling water reactor fuel channel fastener which restricts rotation during torquing and detorquing.

BACKGROUND INFORMATION

Fuel channel fasteners have been used for many years in boiling water reactor fuel assemblies. The purpose of the fastener is to mechanically attach the external fuel channel to the fuel assembly, so that under operating conditions, the reactor coolant is restrained around each fuel assembly. The fastener utilizes a spring to separate the fuel channel from other fuel assemblies in the proximity of the fuel channel. The current designs of fuel channel fasteners, therefore, provide a solid stop between adjacent channels.

Previous fuel channel fastener designs have several significant shortcomings. The bolt in these designs was moved toward a more inward position, as compared to the exterior edge of the fuel channel. The placement of the bolt in this arrangement provided a tendency for the entire fastener to rotate during tightening of the bolt. As manufacturers have modified the bolt position of fuel channel fasteners from a position close to the edge of the fuel channel further toward an inside part of the fuel assembly, the additional distance from the bolt to the external parts of the fastener decreases the rotational resistance due to the additional moment arm.

The rotation of the bolt caused the body of the fastener to rotate on the fuel assembly channel, thus allowing the bottom edge of the fastener body to protrude from the exterior of the channel wall. This rotation thereby allows an additional contact edge which may lead to premature failure of the fuel channel fastener as there is an additional contact surface for impact. The rotation also allows the end of the fuel channel spring to extend beyond the protective configuration of the body of the fastener. When the fastener body or spring extends outward, they are more likely to be damaged by interacting with in-reactor blade guides, fuel storage racks, other fasteners, or reactor components during, for example, fuel assembly movement. Industry experience has shown that fuel channel fasteners can prematurely fail using these designs.

There is a need to provide a fuel channel fastener that will allow for adequate seating of the fuel channel fastener to the fuel assembly.

There is also a need to provide a fuel channel fastener that will be rugged for anticipated operating and accident conditions for a nuclear reactor.

There is a still further need to provide a fuel channel fastener that will be less susceptible to damage compared to current fuel channel fastener designs.

SUMMARY OF THE INVENTION

It is an objective of the current invention to provide a fuel channel fastener that will allow for adequate seating against the fuel channel fastener to the fuel channel.

It is also an objective of the current invention to provide a fuel channel fastener that will be rugged for anticipated operating and accident conditions for a nuclear reactor, while maintaining adequate seating between the fuel channel fastener and the fuel channel.

It is a further objective of the current invention to provide a fuel channel fastener that will be less susceptible to damage compared to current fuel channel fastener designs.

The objectives of the current invention are achieved as described and illustrated. The invention provides a fuel channel fastener. The fuel channel fastener comprises a washer, a body with a first hole, a spring with a second hole and with two perpendicular spring members configured to extend away from the body down sides of a fuel assembly fuel channel, wherein the spring is configured adjacent to the body such that the first hole and the second hole are concentric, a bolt inserted through the washer, the second hole and the first hole, at least two anti-rotation supports attached to the body, and at least two anti-rotation pads connected to the body, wherein the anti-rotation supports are configured to provide resistance to fastener rotation.

DETAILED DESCRIPTION

Figure 1:
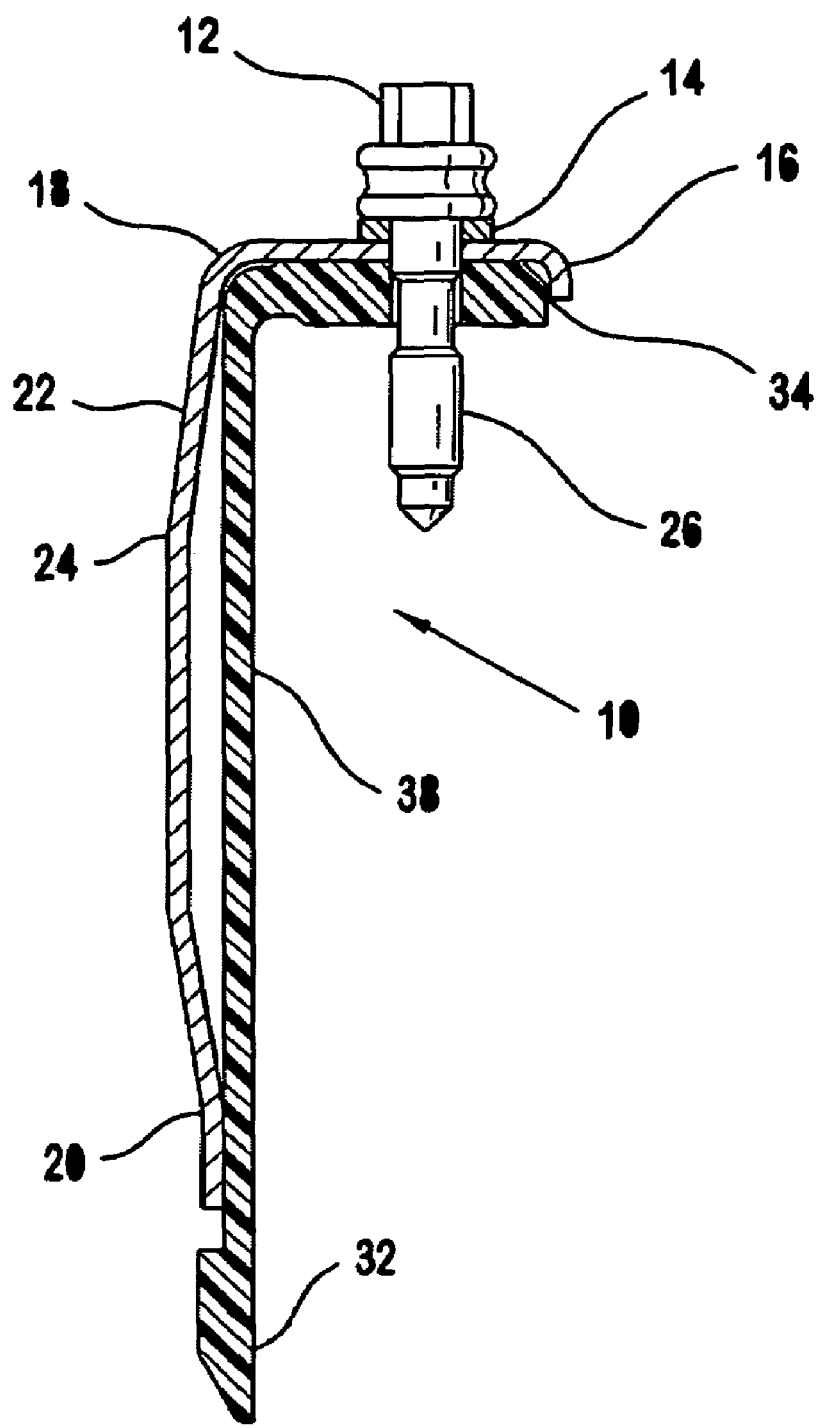
FIG. 1 is a side perspective view of a fuel assembly channel fastener in conformance with an example embodiment of the current invention.

Referring to FIG. 1, a fuel channel fastener 10 for a boiling water reactor fuel assembly is illustrated. The overall length of the fuel channel fastener 10 for the boiling water reactor fuel assembly may be, for example, approximately 5 inches (12.7 cm). The fuel channel fastener 10 is comprised of a bolt 26 that extends through lock washer 14, a body 38 and a spring 22. The fuel channel fastener 10 establishes a connection between a fuel channel of a nuclear fuel assembly and the internal structures of the fuel assembly. This connection allows the fuel channel of the fuel assembly to provide a rigid structure around the fuel assemblies. The fuel channel also allows for the channeling of moderator, such as reactor water, through the internal components of the fuel assembly including the nuclear fuel rods.

The body 38 has a body first end 34 and a body second end 32, wherein the body 38 is configured to fit over an edge of a fuel channel of a nuclear fuel assembly. The body 38 may be inserted near a corner end of a fuel assembly fuel channel such that a surface of the body 38 contacts the exterior surface of the fuel channel. The body 38 is made of a metallic material, such as stainless steel, to account for adequate corrosion resistance. As illustrated, the bolt 26 of the current invention is torqued to about 6 pound feet. The body first end 34 may be configured at a top with a chamfered edge to provide an alignment feature for the spring form. The body second end 32 may be configured with a chamfered end as illustrated to provide a leading edge for interaction. The body 38 is configured with varying uniform thickness to provide adequate strength and form for interfacing with spring 22 and other channel fasteners.

The bolt 26 is inserted through a washer 14. The washer 14 provides an arrangement to accept the bolt head 12 compressive forces and transfer those compressive forces to the spring 22 and the body 38. The washer 14 may be made of materials, such as stainless steel, for example, to limit corrosion or galvanic reaction. The washer 14 can be configured as a locking washer to prevent unintended removal or loosening of the bolt. The washer 14 can have a low profile such that vertical protrusion of the bolt 26 above the top of the fuel assembly is minimized.

The spring 22 is also compressed by the combination of the bolt head 12 connection to the fuel assembly. The spring 22 is configured with a spring first end 16 which extends around the fuel channel to a spring second end 20. The spring 22 has an inflection point 24 such that the spring 22 extends away from the body 38 up to the inflection point 24. The spring 22 is configured with a bend 18 to allow the spring 22 to extend from a horizontal section to a vertical section. The spring 22 may be made of a metallic material which provides a sufficient spring constant so that adjacent fuel is separated during normal reactor operation. The spring 22 may be made of nickel Alloy 718, for example.

The bolt 26 is arranged in a configuration such that the bolt cannot be removed from the body 38 and the spring 22 in 26 a detorqued condition. The body 38 may be staked during manufacturing such that the removal of the bolt 26 from the body 38 and the spring 22 is prevented due to bolt material exceeding bolt hole 52 dimensions. The staking procedure eliminates concerns for loose parts, thereby encouraging foreign material exclusion from sensitive areas of the nuclear reactor.

Figure 2:
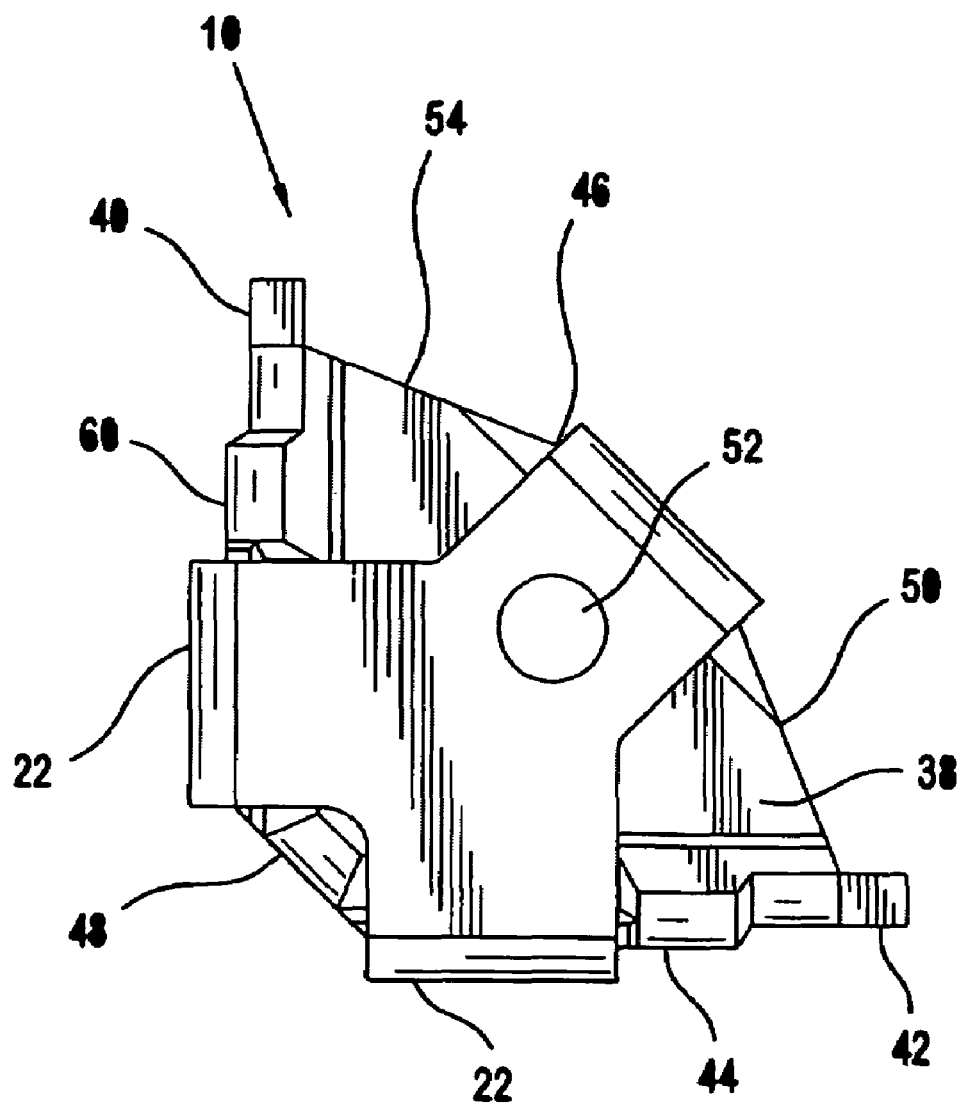
FIG. 2 is a top view of a fuel assembly channel fastener of FIG. 1 wherein bolt 26 and washer 14 have been removed for clarity.

Referring to FIG. 2, a top view of the fuel channel fastener 10 of FIG. 1 is illustrated. Bolt 26 and washer 14 are not illustrated for clarity. The fuel channel fastener 10 has a first anti-rotation support 40 positioned, as illustrated in FIG. 2, on an exterior portion of the fastener 10. The first anti-rotation support 40 is configured to engage the exterior of the fuel channel of the fuel assembly, such that when the bolt 26 is rotated in a clockwise direction, the resulting overall torque placed on the fuel channel fastener 10 will cause the first anti-rotation support 40 to contact the external surface of the fuel channel. The resulting contact between the first anti-rotation support 40 and the external surface of the fuel channel restricts movement of the fastener during torquing thereby allowing tightening of the fastener without fastener rotation. A second anti-rotation support 42 is located on an opposite corner of the fastener 10. The second anti-rotation support 42, similar to the first anti-rotation support 40, contacts the external surface of the fuel channel of the fuel assembly, such that when the bolt 26 is detorqued, the second anti-rotation support 42 contacts the fuel channel, thereby preventing rotation of the fuel channel fastener 10. As an illustrative example, the supports 40, 42 may be approximately 0.38 millimeters in thickness.

The bolt hole 52 is positioned such that it is located away from the edge of the fastener and such that the hole 52 is positioned along an axis drawn from the joints formed from the intersection of anti-rotation support 42 and back adjacent edge 50 with anti-rotation support 40 and back adjacent edge 54. Other configurations of hole position may be chosen, wherein the bolt hole 52 is moved respectively toward the front edge 48 or the back edge 46. The configuration presented, therefore, is merely illustrative of the possible configurations, including bolt hole 52 positions near the edge of the back edge 46, for example.

The first anti-rotation pad 60 is in between spring 22 and the first anti-rotation support 40. The second anti-rotation pad 44 is likewise in between spring 22 and the second anti-rotation support 42. The first anti-rotation pad 60 and second anti-rotation pad 44 contact the spring 22 during torquing and detorquing of the bolt 26 to prevent the spring from rotating.

Figure 3:
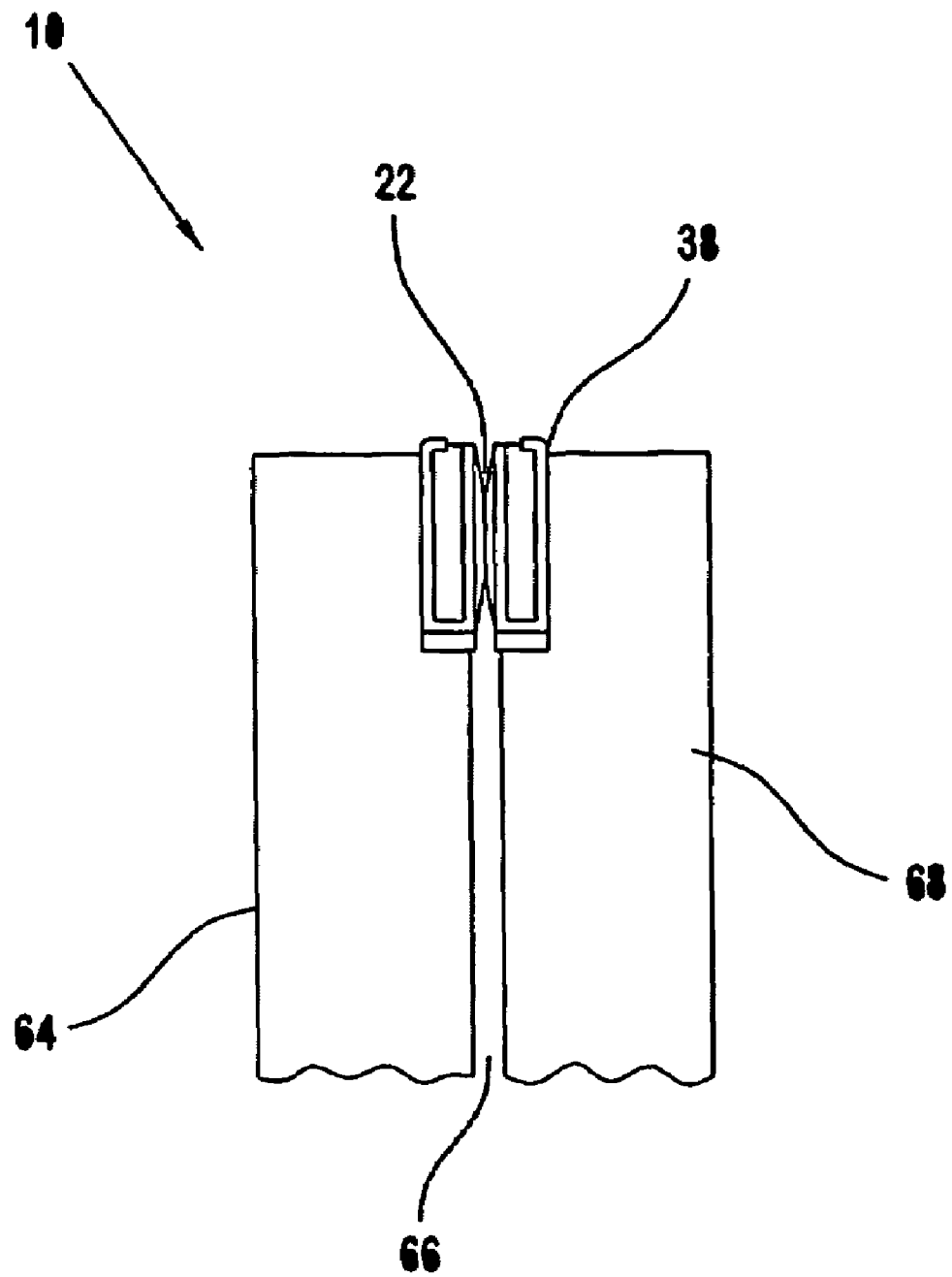
FIG. 3 is a side view of the fuel assembly channel fastener of FIG. 1 in an installed arrangement.

FIG. 3 presents a side view of a fuel channel fastener 10 installed on a fuel channel 64 in contact with another fuel channel 68. The fuel channel fastener 10 positioned on each fuel channel 64 has a spring 22 which provides a bearing surface between the individual fuel channels 64, 68. The springs 22 of the individual fuel channel fasteners 10 contact other adjacent springs 22. The springs 22 are configured to deflect a sufficient amount such that a space 66 is always maintained between the respective fuel channels 64, 68.

Figure 4:
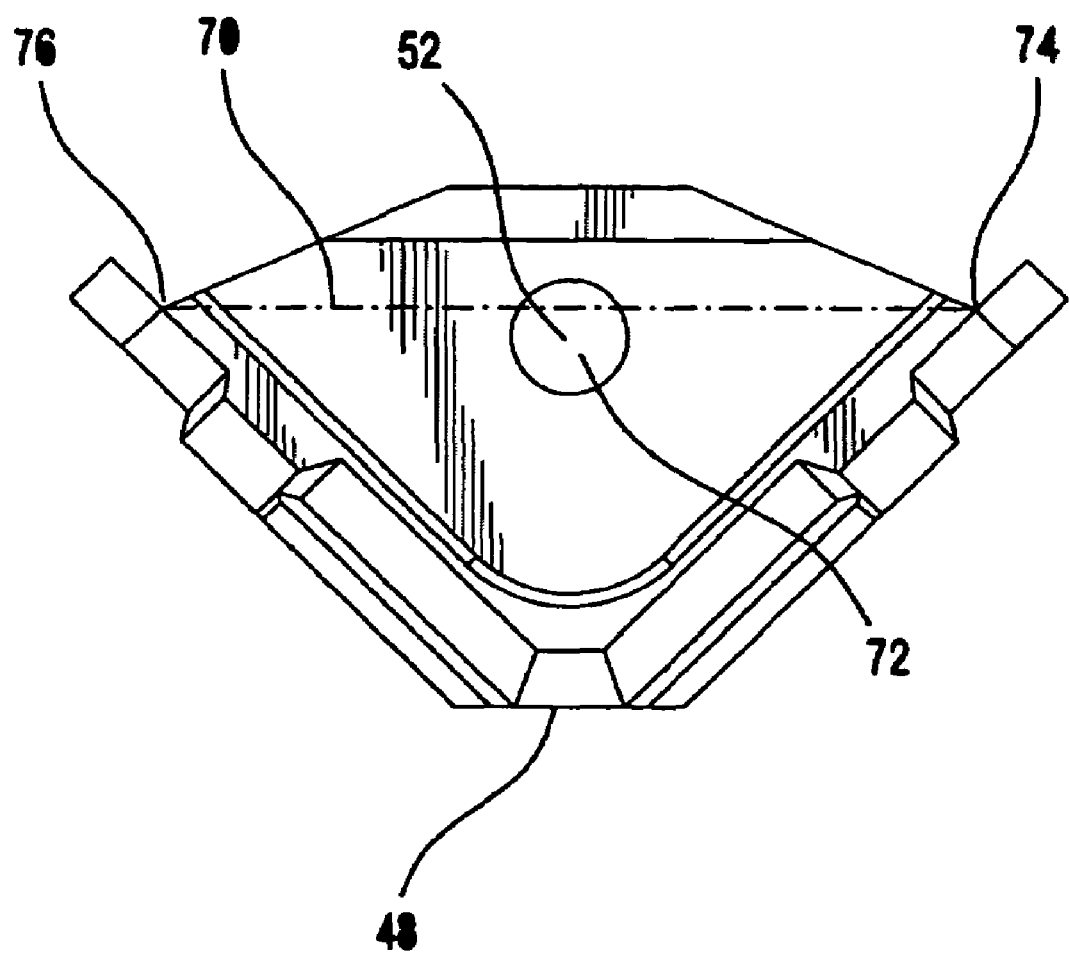
FIG. 4 is a top view of the fuel assembly channel fastener of FIG. 1 for discussion purposes with previous fastener plate design configurations.

Referring to FIG. 4, a top view of the fuel channel fastener 10 of the present invention is illustrated. A center point 72 of the hole 52 is located along a neutral axis 70 defined by a first body connection end point 74 and a second body connection end point 76. Other configurations are possible wherein the center point 72 of the hole 52 may be closer or further from the front edge 48.

Figure 5:
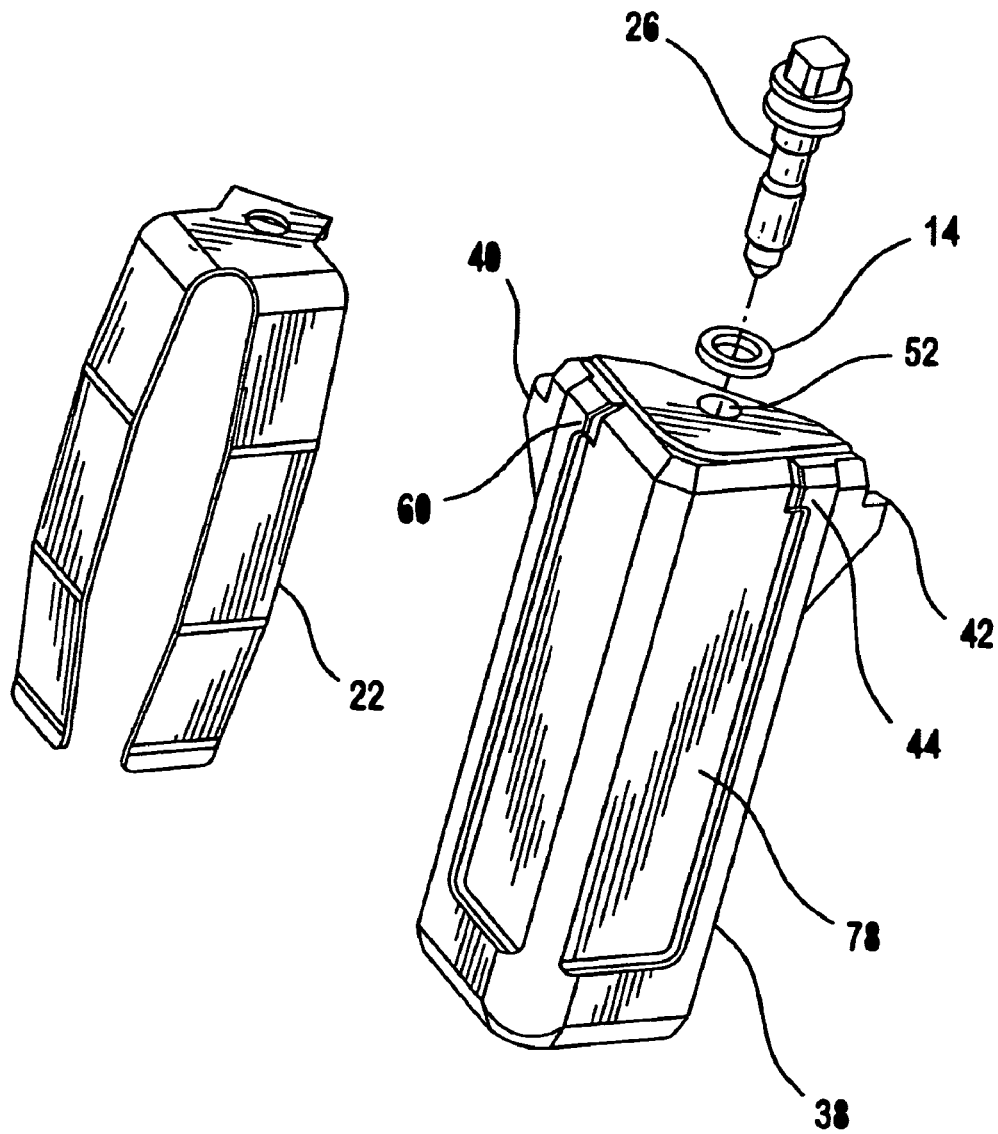
FIG. 5 is a side perspective view of the components of the fuel assembly channel fastener with the individual components separated.

Referring to FIG. 5, a side perspective view of the fuel channel fastener 10 with the individual components separated is illustrated. The bolt 26 is inserted through the washer 14 and the spring 22 into the bolt hole 52. The spring 22 is placed over the body 38 and into depressions 78 located on the body 38.

The present invention provides a fuel channel fastener 10 which provides for a connection between the fuel channel and a fuel assembly. The fuel channel fastener 10 provided in the current invention prevents rotation of the fuel channel fastener 10 during tightening and loosening. The fuel assembly channel fastener 10 of the current invention provides a more resistant structure for bending as compared to other designs. The anti-rotation capabilities of the fuel assembly channel fastener 10 are established without modifying fuel channels of fuel assemblies and without detrimental impact to overall core flow characteristics.

In the foregoing specification, the invention has been described with reference to specific exemplary embodiments, thereof. It will be evident that modifications and changes may be made thereunto without departing from the broader spirit and scope of the invention as set forth in the appended claims. The specification and drawings are accordingly to be regarded in an illustrative rather than a restrictive sense.

What is claimed is:

1. A fuel channel fastener, comprising
   a washer;
   a body with a first hole;
   a spring with a second hole and with two perpendicular spring members configured to extend away from the body down at least one side of a fuel assembly fuel channel, wherein the spring is arranged adjacent to the body such that the first hole and the second hole are concentric;
   a bolt inserted through the washer, the second hole, and the first hole;
   at least two anti-rotation supports attached to the body; and
   at least two anti-rotation pads connected to the body, wherein each of the at least two anti-rotation pads is located horizontally in between one of the at least two anti-rotation supports and one of the two perpendicular spring members, and wherein the anti-rotation supports are configured to provide resistance to body rotation during a tightening of the bolt.

2. The fuel channel fastener according to claim 1, wherein the bolt is configured to not be removed from the body.

3. The fuel channel fastener according to claim 1, wherein one of the at least two anti-rotation supports and one of the at least two anti-rotation pads are configured together as a single unit.

4. The fuel assembly channel fastener according to claim 1, wherein the body and washer are made of corrosion resistant material.

5. The fuel assembly channel fastener according to claim 1, wherein the body is made of stainless steel.

6. The fuel assembly channel fastener according to claim 1, wherein the body is configured to tilt when torqued.

7. The fuel assembly channel fastener according to claim 1, wherein the anti-rotation pads are configured to prevent rotation of the spring during rotation of the bolt.

8. The fuel assembly channel fastener according to claim 1, wherein the fastener body has an increased volume area at a top to resist axial loads from a lower end of the body.

9. The fuel assembly channel fastener according to claim 1, wherein the two perpendicular spring members are configured to extend away from the body and down two sides of the fuel assembly fuel channel.

10. The fuel assembly channel fastener according to claim 1, wherein each of the anti-rotation pads extends outwardly beyond an outer surface of the body over which one of the spring members is located.

11. A fuel channel fastener, comprising
a washer;
a body with a first hole;
a spring with a second hole and with two perpendicular spring members configured to extend away from the body down at least one side of a fuel assembly fuel channel, wherein the spring is arranged adjacent to the body such that the first hole and the second hole are concentric;
a bolt inserted through the washer, the second hole, and the first hole;
two anti-rotation supports attached to the body; and
two anti-rotation pads connected to the body, wherein each of the anti-rotation pads is located in between one of the anti-rotation supports and one of the perpendicular spring members, each of the anti-rotation pads extending outwardly beyond an outer surface of the body over which one of the spring members is located, wherein the anti-rotation pads are configured to prevent rotation of the spring about the first hole during a torquing of the bolt, and wherein the anti-rotation supports are configured to provide resistance to body rotation about the first hole during a torquing of the bolt.

12. A fuel channel fastener, comprising
a washer;
a body with a first hole;
a spring with a second hole and with a plurality of perpendicular spring members configured to extend away from the body down at least one side of a fuel assembly fuel channel, wherein the spring is arranged adjacent to the body such that the first hole and the second hole are concentric;
a bolt inserted through the washer, the second hole, and the first hole;
a plurality of anti-rotation supports attached to the body; and
a plurality of anti-rotation pads connected to the body, wherein each of the plurality of anti-rotation pads is located in between one of the plurality of anti-rotation supports and one of the plurality of perpendicular spring members, each of the plurality anti-rotation pads extending outwardly beyond an outer surface of the body over which one of the plurality of spring members is located, wherein the plurality of anti-rotation pads is configured to prevent rotation of the spring about the first hole during a tightening of the bolt, and wherein the anti-rotation supports are configured to provide resistance to body rotation during a tightening of the bolt.

\* \* \* \* \*